United States Patent
Serarslan et al.

(10) Patent No.: US 8,280,591 B2
(45) Date of Patent: Oct. 2, 2012

(54) METHOD FOR MONITORING THE VEHICLE HANDLING OF A TWO TRACK VEHICLE

(75) Inventors: Benan Serarslan, Munich (DE); Max von Groll, Munich (DE); Stefan Gietl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1061 days.

(21) Appl. No.: 12/171,996

(22) Filed: Jul. 11, 2008

(65) Prior Publication Data

US 2009/0069982 A1    Mar. 12, 2009

(30) Foreign Application Priority Data

Sep. 11, 2007  (DE) .................. 10 2007 043 209
Sep. 11, 2007  (DE) .................. 10 2007 043 210

(51) Int. Cl.
B62D 6/00  (2006.01)
(52) U.S. Cl. .......................................... 701/42; 701/41
(58) Field of Classification Search .......... 701/1, 36–38, 701/41–42, 45–47; 303/139–140, 146
See application file for complete search history.

(56) References Cited

U.S. PATENT DOCUMENTS

| | | | | |
|---|---|---|---|---|
| 4,703,822 A * | 11/1987 | Kawamoto et al. | ........... | 180/412 |
| 4,969,212 A * | 11/1990 | Walter | ............. | 701/29 |
| 5,388,658 A * | 2/1995 | Ando et al. | .................... | 180/197 |
| 5,402,342 A * | 3/1995 | Ehret et al. | ......................... | 701/1 |
| 5,615,117 A * | 3/1997 | Serizawa | ....................... | 701/42 |
| 6,089,680 A * | 7/2000 | Yoshioka et al. | ............. | 303/146 |
| 6,091,214 A * | 7/2000 | Yamawaki et al. | ............. | 318/52 |
| 6,308,115 B1 * | 10/2001 | Yamaguchi et al. | ............... | 701/1 |
| 6,405,113 B1 * | 6/2002 | Yamawaki et al. | ............. | 701/41 |
| 6,470,241 B2 * | 10/2002 | Yoshikawa | ......................... | 701/1 |
| 6,643,573 B2 * | 11/2003 | Dickinson et al. | ............. | 701/41 |
| 6,745,112 B2 * | 6/2004 | Mori | ................................ | 701/1 |
| 6,954,691 B2 * | 10/2005 | Roll et al. | ......................... | 701/70 |
| 6,957,873 B2 * | 10/2005 | Wanke et al. | ................. | 303/140 |
| 2004/0016294 A1 * | 1/2004 | Sugitani et al. | ................. | 73/146 |
| 2005/0240326 A1 * | 10/2005 | Lauwerys et al. | ............. | 701/38 |

(Continued)

FOREIGN PATENT DOCUMENTS

DE        100 59 689 A1    6/2001
(Continued)

Primary Examiner — John Nguyen
Assistant Examiner — Michael Ng
(74) Attorney, Agent, or Firm — Crowell & Moring LLP

(57) ABSTRACT

A method monitors the vehicle handling of a vehicle with respect to vehicle stability by comparing a measured variable, which reflects the yaw rate or the lateral acceleration, with a comparison value, which is derived from the steering angle, specified by the driver. The gradients of the regression lines, which are normalized in relation to each other, of the measured variable, on the one hand, and the comparison value, which represents the steering angle, on the other hand, are compared continuously over a number of analysis time windows. Upon finding a significant deviation between these gradients, an unstable driving condition is concluded. The difference between the gradients of the regression lines, which may be determined by a first order least squares method and normalized to the same units by a suitably applied amplification factor, are determined and compared with a suitably determined limit value, above which an instability is inferred. Alternatively, the measured variable and the comparison value, which represents the steering angle, can be analyzed for a linear or nonlinear dependence within an analysis time window by a coherence analysis; and on detection of a noteworthy nonlinearity, an unstable driving condition can be concluded.

8 Claims, 2 Drawing Sheets

U.S. PATENT DOCUMENTS

2006/0085112 A1* 4/2006 Lu et al. ............ 701/38
2006/0158031 A1* 7/2006 Kummel et al. ............ 303/146
2007/0260383 A1* 11/2007 Sundaram et al. ............ 701/70
2008/0269974 A1* 10/2008 Schwarz et al. ............ 701/29
2011/0144865 A1* 6/2011 Niemz ............ 701/42

FOREIGN PATENT DOCUMENTS

DE 103 32 581 A1 11/2004

* cited by examiner

METHOD FOR MONITORING THE VEHICLE HANDLING OF A TWO TRACK VEHICLE

CROSS-REFERENCE TO RELATED APPLICATION

This application claims the priorities of German Application Nos. 10 2007 043 209.9 and 10 2007 043 210.2, filed Sep. 11, 2007, the disclosures of which are expressly incorporated by reference herein.

BACKGROUND AND SUMMARY OF THE INVENTION

The invention relates to a method for monitoring the vehicle handling of a vehicle, in particular a two track vehicle, with respect to the vehicle stability by comparing a measured variable, which reflects the yaw rate or the lateral acceleration of the vehicle, with a comparison value, which is derived from the steering angle, specified by the driver of the vehicle.

Vehicle dynamic control systems, which stabilize, for example, a passenger vehicle in critical driving situations, are known in principle, for example, in the form of the so-called Electronic Stability Program (ESP). Such systems produce, for example, a yaw moment, which is directed against an oversteering of the vehicle. However, at the same time it is necessary to detect as early as possible an oversteering or understeering of the vehicle with adequate accuracy. The more accurate this detection, the more effectively a stabilization function (of any kind whatsoever) can be applied.

One possible method for detecting the understeering or oversteering is to compare the measured vehicle dynamics variables, such as the yaw rate and/or the lateral acceleration, with corresponding simulated values derived from a linear vehicle model. In this case, the difference between the measurement and the simulation is interpreted as a measure of the nonlinear characteristics of a current vehicle reaction. However, this method has the drawback that the model that is used has to match, exactly as possible, the individual vehicle parameters, like mass, inertia moment, sideslip stiffness of the tires, etc. A variation in these parameters, for example due to loading, upsets the model and, thus, increases the deviation between the measurement and the stimulation so that, when this model is used, it is quite possible that the current driving condition may be interpreted as nonlinear even though the vehicle exhibits a linear and, thus, non-critical characteristic.

The present invention provides an improved method for monitoring the vehicle handling of a vehicle, in particular a two track vehicle, with respect to the vehicle stability by comparing a measured variable, which reflects the yaw rate or the lateral acceleration of the vehicle, with a comparison value, which is derived from the steering angle, specified by the driver of the vehicle.

According to the invention, the gradients of the regression lines, which are normalized in relation to each other, of the measured variable, on the one hand, and the comparison value, which represents the steering angle, on the other hand, are compared continuously over a number of analysis time windows. Upon finding a significant deviation between these gradients, an unstable driving condition is concluded.

It was recognized that a nonlinear and, thus, unstable vehicle handling of a vehicle can be determined by finding the gradient differences by use of a regression analysis without having to take into consideration the individual vehicle parameters, such as the vehicle mass or the actual type of tire and the like. The invention analyzes, in particular, only whether there is a significant difference between the respective gradient(s) between the temporal course of an input value of the system to be examined—thus, in this case between the temporal course of the driver's specified steering angle and a corresponding system response—that is, the temporal course of a system output value in the form of the lateral acceleration and/or yaw rate of the vehicle. If, therefore, there is a significant difference, then it is possible to conclude an unstable driving condition. For example, at the beginning of a typical stationary understeering, the gradient of the steeling angle remains unchanged over time, whereas the gradient of the lateral acceleration and the yaw rate decreases, as viewed over time.

Preferably, the difference between the gradients of the regression lines, which are determined by a first order least squares method and normalized to the same units by a suitably applied amplification factor, is determined and compared with a suitably determined limit value, above which an instability is inferred. Thus, even if the boundary conditions change, such as loading and, thus, in the event of a varying mass of the vehicle, or in the event of a change in the inertia moment, or in the event of a varying sideslip stiffness of the tires, and the like, it is possible with this method to monitor with high robustness the vehicle handling with respect to the vehicle stability in a simple manner and with a minimum application complexity over the entire service life of the vehicle. If a gradient difference, which is referred to as significant, is detected, then at the current time there exists an unstable driving condition, and a suitable chassis control system may intervene in a stabilizing manner.

Other objects, advantages and novel features of the present invention will become apparent from the following detailed description when considered in conjunction with the accompanying drawings.

DETAILED DESCRIPTION OF THE DRAWINGS

Figure 1:
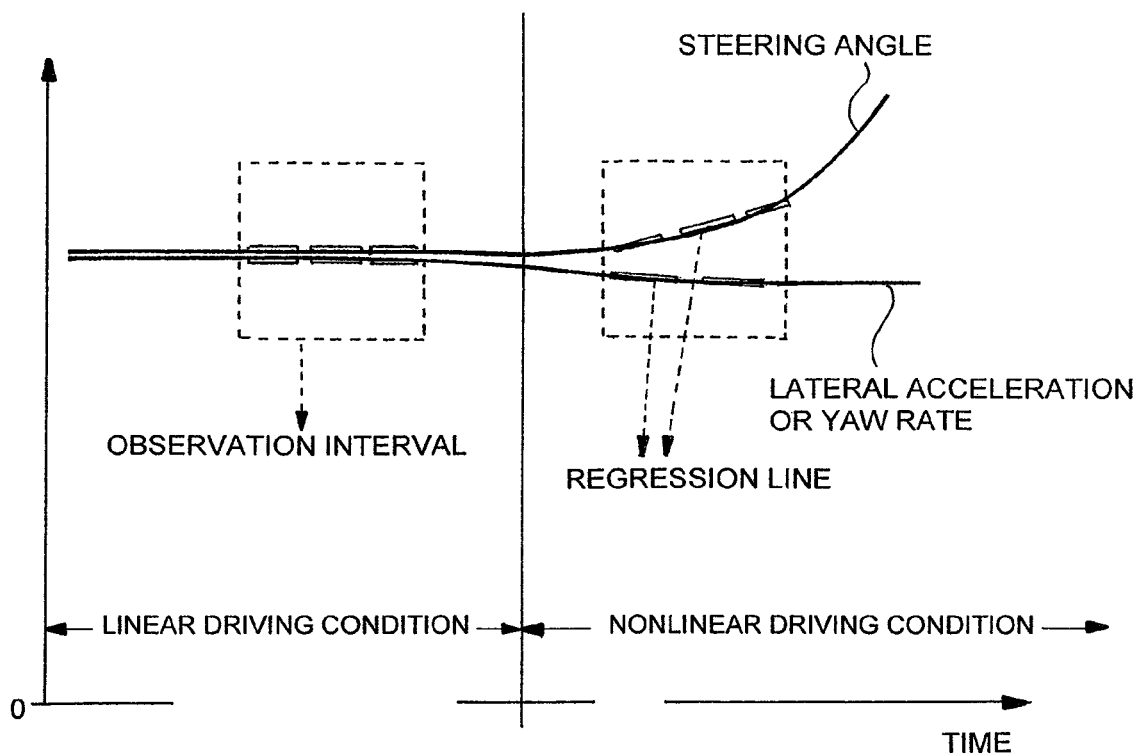
FIG. 1 is a graph illustrating the temporal course of the steering angle and the lateral acceleration or yaw rate.

FIG. 1 illustrates an exemplary temporal course of the steering angle and the lateral acceleration or the yaw rate. First, there is a stable and, thus, linear driving condition (viewed over time), and then there is an unstable and, thus, nonlinear driving condition. Therefore, an observation interval is plotted (in the form of a dashed square), within which the regression lines of these two variables "steeling angle" and "lateral acceleration or yaw rate" are formed continuously over a number of so-called analysis time windows and then compared with respect to their gradient.

With respect to the above described normalization of the regression line of the measured variable, on the one hand, and the comparison value, which represents the steering angle, on the other hand, in relation to each other, this is necessary because the system input value, namely the steering angle, and the system response or system output value, namely the measured lateral acceleration or the yaw rate of the vehicle, exhibit a variety of units and, therefore, have to be normalized to the same units. A suitable correction factor may be determined, for example experimentally in driving tests. Furthermore, a system induced time delay between the input value, namely a "jump" in the temporal course of the steering angle, and the subsequent system response may be considered, preferably, during the gradient analysis—that is, in the selection of the segments of the regression line of the steeling angle that are to be compared with respect to their gradient in an observation interval, on the one hand, and the lateral acceleration or yaw rate, on the other hand.

When the sought regression coefficients are determined by means of a first order least squares method, then the method that is proposed here may be described by the following equation:

$$a_b^{Lewi} - a_b^{Querb} = \frac{\sum_{i=\tau}^{Ns} x_{iL} y_{iL} - \bar{y} \sum_{i=\tau}^{Ns} x_{iL}}{\sum_{i=\tau}^{Ns} x_{iL}^2 - \bar{x} \sum_{i=\tau}^{Ns} x_{iL}} - \frac{\sum_{i=0}^{Ns} x_{iL} K y_{iL} - K\bar{y} \sum_{i=0}^{Ns} x_{iL}}{\sum_{i=0}^{Ns} x_{iL}^2 - \bar{x} \sum_{i=0}^{Ns} x_{iL}}$$

In this case $a_b^{Lewi}$ denotes the gradient of the regression line of the steering angle and/or the steering angle signal; and $a_b^{Querb}$ denotes the gradient of the regression line of the lateral acceleration in a so-called observation interval, which extends over a plurality of analysis time windows.

In this case, Ns is the number of so-called analysis time windows, which are included in an observation interval and specified by the scanning period. Therefore, it is a matter of course that the quality of the results of the regression depends on this number. The larger this number Ns is, the higher the robustness of the detection in the stable driving condition range. However, a high number Ns is disadvantageous for a fast detection of a sudden unstable driving condition.

The letter K denotes the correction factor, which has already been mentioned above and which is intended for normalizing the steering angle and the system response (=measured lateral acceleration or yaw rate of the vehicle) to the same units. The Greek letter τ denotes the time delay (which has also been already mentioned) between the system input (=a steering angle jump) and the system response and may be, for example, in a magnitude of 100 milliseconds for a specific type of vehicle as well as for the application cases that are to be viewed.

Finally, the letter L in the above equation denotes the number of analysis time windows, which are to be considered in the observation interval and which may be far less than the number Ns of the analysis time windows that are included in the observation interval. Therefore, the resolution of the measurement and/or analysis may be rougher. In this case a small value of L leads to a faster, but less robust detection of the unstable vehicle handling.

In a thoroughly studied embodiment, a limit value of 0.75 (without units) was determined with the above equation where the units "° (degree)" for the steering angle and for the yaw rate, as well as "m/s$^2$" for the lateral acceleration, were used. Upon exceeding this amount of 0.75, there was an unstable driving condition.

In special cases, namely in quasi-stationary driving conditions, the initially proposed analysis of the gradient differences may be inadequate for determining with certainty an unstable driving condition—in particular, when the instability lasts longer than the observation interval. In order to determine, nevertheless, with certainty an unstable driving condition, it is proposed that the difference between the sideslip angles ($\alpha$) at the front wheel and the rear wheel of the vehicle be additionally considered and that, upon exceeding a limit value for the same, an unstable driving condition is inferred despite the stability that is inferred from the analysis of the gradients of the regression lines that are normalized in relation to each other.

As is well-known, the difference $\Delta a$ between these sideslip angles ($\alpha_{frontwheel} - \alpha_{rearwheel}$) is determined with the following formula:

$$\Delta\alpha = \delta - (L * d\phi/dt)/v,$$

where L denotes the wheel base of the vehicle; v denotes its driving speed; $d\phi/dt$ denotes the measured yaw rate; and $\delta$ denotes the steering angle. Here, "*" denotes a mathematical multiplication and "/" denotes a division. If the value of $\Delta\alpha$ exceeds a defined limit value, which indicates an unstable driving condition, even though the above described analysis of the gradient differences has a value that indicates a stable driving condition, this additional information about the sideslip angle difference $\Delta\alpha$ makes it possible to detect an unstable driving condition even in a quasi-stationary case. This calculation of the sideslip angle difference $\Delta\alpha$ also enables, in an advantageous way, an unequivocal detection of the nature of the unstable driving condition—that is, whether there is an understeering or an oversteering.

Another solution to the aforementioned problem consists of analyzing the measured variable and the comparison value, which represents the steering angle, for a linear or nonlinear dependence within an analysis time window by using a coherence analysis. Furthermore, a noteworthy nonlinearity is detected, an unstable driving condition is concluded.

In this case, coherence analyses are used to determine a nonlinear and, therefore, unstable vehicle handling of a vehicle without having to take into consideration the individual vehicle parameters, such as the vehicle mass or the actual type of tires and the like. The sole factor that is examined is whether there is a linear relationship between an input variable of the system to be analyzed—thus, in this case between the driver's specified steering angle and a corresponding system response—that is, a system output value in the form of the lateral acceleration and/or yaw rate of the vehicle. If such a linear relationship can be found or confirmed, then there exists a stable driving condition, whereas in the event of a noteworthy nonlinearity it is possible to conclude an unstable driving condition.

Even if the boundary conditions change, such as loading and, thus, in the event of a varying mass of the vehicle, or in the event of a change in the inertia moment or in the event of a different sideslip stiffness of the tires and the like, it is possible in this way to monitor with high robustness the vehicle handling with respect to the vehicle stability in a simple way and with minimum application complexity over the entire service life of the vehicle. If in this case a nonlinearity is detected, then at the current time there exists an unstable driving condition, and a suitable chassis control system may intervene in a stabilizing manner.

As is well-known, the coherence function represents a measure for the degree of the linear dependence of two signals x(t) and y(t) (where t=time) over the frequency f according to the additive property (that is f(x+y)=f(x)+f(y)) and homogeneity (that is, K*f(x)=f(K*x) where K=constant and * multiplication). If there is total linear dependence, then the square of the amount of the cross power density spectrum $G_{XY}(f)$ is as large as the product of the auto power density spectra $G_{XX}(f)$ and $G_{YY}(f)$. Therefore, the value "1" holds for the coherence in the entire frequency range (f).

In principle, the coherence is calculated, as well-known, according to the following equation:

$$\gamma_{XY}^2(f) = \frac{|\langle G_{XY}(f)\rangle|^2}{\langle G_{XX}(f)\rangle \cdot \langle G_{YY}(f)\rangle}.$$

In this case, a spectral estimate can be made using nonparametric methods, such as the Welch method, by which then the corresponding power density spectra can be calculated, and then the power density spectra can be used in the coherence function.

At this point in the present case a coherence analysis shall be used to study continuously a linearity or nonlinearity between the steering angle (as the system input value) and the vehicle dynamics characteristic(s) "lateral acceleration" and/or "yaw rate" as the system output value(s). This is done with all analysis time window, which runs simultaneously in terms of time, but is constant in its breadth. In this case it is then assumed that the driver cannot generate in essence any excitation amplitudes above a frequency of 5 Hertz with his steering actions. If, then, the coherence shows a value of "1" in this frequency interval (0 Hz to 5 Hz), then there exists a total linear dependence in this frequency interval, from which a stable driving condition is inferred. If, in contrast, the coherence shows in a significant way a value that is not equal to 1 in this frequency interval, then the driving condition is interpreted as unstable.

For example, an analysis time window that extends beyond 0.5 seconds can be observed. Within this analysis time window a coherence analysis between the driver's specified steering angle and the lateral acceleration or yaw rate of the vehicle is executed. Preferably, the criterion for the evaluation in accordance with this coherence analysis is deemed the area below a so-called coherence line, which reflects the coherence in values ranging from "1" to "0" in a preferred frequency interval ranging from 0 Hertz to 5 Hertz. In the attached FIG. 2, in which an exemplary so-called coherence line, which is labeled with the reference letters KL, is plotted over the frequency, this area is marked with the letter A.

Figure 2:
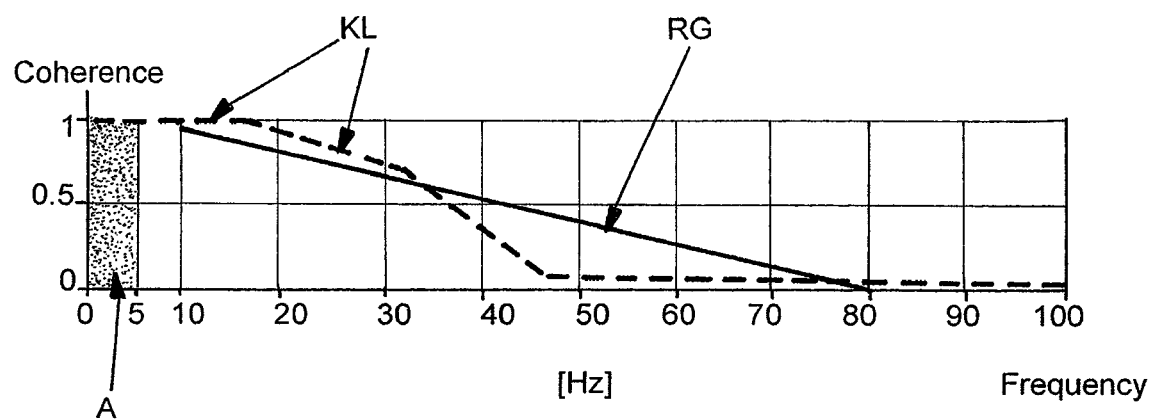
FIG. 2 is a graph illustrating an exemplary coherence line plotted with respect to frequency.

As an alternative or in addition, the gradient of a regression line, which is marked with the letters RG in the attached FIG. 2, in relation to the coherence line, which reflects the coherence in values ranging from "1" to "0," may be observed in a frequency range, which extends up to frequency values that are considerably higher frequency values than those specified by the driver—for example, up to 100 Hertz in FIG. 2. Studies have demonstrated that unanimous conclusions about the stable or unstable driving condition can be drawn from a coherence analysis in this wider frequency range. For example, in the event of a gradient of the regression line RG of the coherence, the amount of which is higher (positive in the drawing of the figures), an unstable driving condition may be inferred; and in the event of a gradient of the regression line RG of the coherence, the amount of which is less (negative in the drawing of the figures) a stable driving condition may be inferred.

If the gradient of the regression line RG is viewed in relationship to the amount of the area A (below the so-called coherence line KL, which reflects the coherence in values between "1" and "0" in a frequency interval here between 0 Hertz and 5 Hertz), then a linear dependence and, thus, a stable driving condition crystallizes out of the specific studies, if this area A was larger than 3 Hertz (as the unit of measure of this area), and the amount of the negative gradient of the regression line RG was less than 0.1, whereas nonlinearity and, thus, an unstable driving condition existed for an area A less than 3 Hertz and an amount of the negative gradient of the regression line RG greater than 0.025. However, this feature and a plurality of other details may deviate from the above explanations without departing from the scope of the claims.

The foregoing disclosure has been set forth merely to illustrate one or more embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring vehicle handling of a vehicle with respect to vehicle stability using a measured variable reflecting a yaw rate or lateral acceleration of the vehicle and a steering angle value, the method comprising the acts of:
   normalizing gradients of regression lines of the measured variable and the steering angle value to the same units;
   comparing normalized gradients of the regression lines of the measured variable to normalized gradients of the regression lines of the steering angle continuously over a plurality of analysis time windows; and
   upon detecting a significant deviation between the gradients, concluding an unstable driving condition of the vehicle.

2. The method according to claim 1, wherein the regression lines are determined via a first order least squares method and are normalized into the same units by applying an amplification factor to the regression lines; and
   further wherein a difference between the gradients of the regression lines is determined and compared with a predefined limit value, above which the unstable driving condition is inferred.

3. The method according to claim 2, wherein a time delay between a jump in a steering angle and a subsequent system response is determined.

4. The method according to claim 3, further comprising the acts of:
   determining a difference between sideslip angles at a front wheel and a rear wheel of the vehicle;
   inferring an unstable driving condition of the vehicle when the difference between the sideslip angles exceeds a predefined limit value, even if there is no conclusion of an unstable driving condition from the comparison of the gradients of the regression lines.

5. The method according to claim 2, further comprising the acts of:
   determining a difference between sideslip angles at a front wheel and a rear wheel of the vehicle;
   inferring an unstable driving condition of the vehicle when the difference between the sideslip angles exceeds a predefined limit value, even if there is no conclusion of an unstable driving condition from the comparison of the gradients of the regression lines.

6. The method according to claim 1, wherein a time delay between a jump in a steering angle and a subsequent system response is determined.

7. The method according to claim 6, further comprising the acts of:
   determining a difference between sideslip angles at a front wheel and a rear wheel of the vehicle;
   inferring an unstable driving condition of the vehicle when the difference between the sideslip angles exceeds a predefined limit value, even if there is no conclusion of an unstable driving condition from the comparison of the gradients of the regression lines.

8. The method according to claim 1, further comprising the acts of:

determining a difference between sideslip angles at a front wheel and a rear wheel of the vehicle;

inferring an unstable driving condition of the vehicle when the difference between the sideslip angles exceeds a predefined limit value, even if there is no conclusion of an unstable driving condition from the comparison of the gradients of the regression lines.

* * * * *